US005594608A

United States Patent [19]
Dee

[11] Patent Number: 5,594,608
[45] Date of Patent: Jan. 14, 1997

[54] MAGNETIC TAPE HEAD WITH A HIGH SATURATION FLUX DENSITY MAGNETIC POLE INTERPOSED BETWEEN A NONMAGNETIC CLOSURE SECTION AND A MAGNETIC FERRITE SUBSTRATE

[75] Inventor: Richard H. Dee, Louisville, Colo.

[73] Assignee: Storage Technology Corporation, Louisville, Colo.

[21] Appl. No.: 263,884

[22] Filed: Jun. 22, 1994

[51] Int. Cl.$^6$ ................................................. G11B 5/147
[52] U.S. Cl. .................................................. 360/126
[58] Field of Search ........................... 360/121, 125–127, 360/120, 119

[56] References Cited

U.S. PATENT DOCUMENTS

| | | | |
|---|---|---|---|
| 4,150,981 | 4/1979 | O'Handley | 75/170 |
| 4,375,657 | 3/1983 | Brock et al. | 360/127 |
| 4,376,337 | 3/1983 | Kobayasi et al. | 360/127 |
| 4,488,195 | 12/1984 | Yanagiuchi et al. | 360/125 |
| 4,578,728 | 3/1986 | Sakakima et al. | 360/125 |
| 4,636,898 | 1/1987 | Suzuki et al. | 360/122 |
| 4,651,248 | 3/1987 | Shiiki et al. | 360/119 |
| 4,755,899 | 7/1988 | Kobayashi et al. | 360/125 |
| 4,797,767 | 1/1989 | Baus, Jr. | 360/121 |
| 4,864,717 | 9/1989 | Baus, Jr. | 29/603 |
| 4,884,157 | 11/1989 | Roberts et al. | 360/125 |
| 4,899,434 | 2/1990 | Roberts | 29/603 |
| 4,901,179 | 2/1990 | Satomi et al. | 360/126 |
| 4,951,166 | 8/1990 | Schewe | 360/125 |
| 4,967,300 | 10/1990 | Reid et al. | 360/122 |
| 5,065,483 | 11/1991 | Zammit | 29/603 |
| 5,142,768 | 9/1992 | Aboaf et al. | 29/603 |
| 5,157,569 | 10/1992 | Kumasaka et al. | 360/126 |
| 5,164,870 | 11/1992 | Kato et al. | 360/119 |
| 5,296,993 | 3/1994 | Aboaf et al. | 360/126 |

Primary Examiner—Stuart S. Levy
Assistant Examiner—David D. Davis
Attorney, Agent, or Firm—Sterne, Kessler, Goldstein & Fox P.L.L.C.

[57] ABSTRACT

A high efficiency write element for use with a multiple element, multiple track longitudinal magnetic tape head. The write element includes a recess formed in the surface of the substrate in which a conductive thin film coil is disposed. This places the coil windings below the surface of the substrate resulting in a planar substrate surface. The ferrite substrate also includes a trench formed in the recess which is parallel to the front gap region and filled with a nonmagnetic composition. An insulator is interposed between the conductive thin film coil and the ferrite substrate to produce a gap spacer when the ferrite substrate is mated with a closure section. The closure section is a planar nonmagnetic material having a magnetic pole piece of a high saturation magnetic flux density material deposited on its surface. The ferrite substrate and closure section are mated such that the magnetic pole piece is positioned in the front gap and the back gap of the resulting magnetic tape head module.

12 Claims, 7 Drawing Sheets

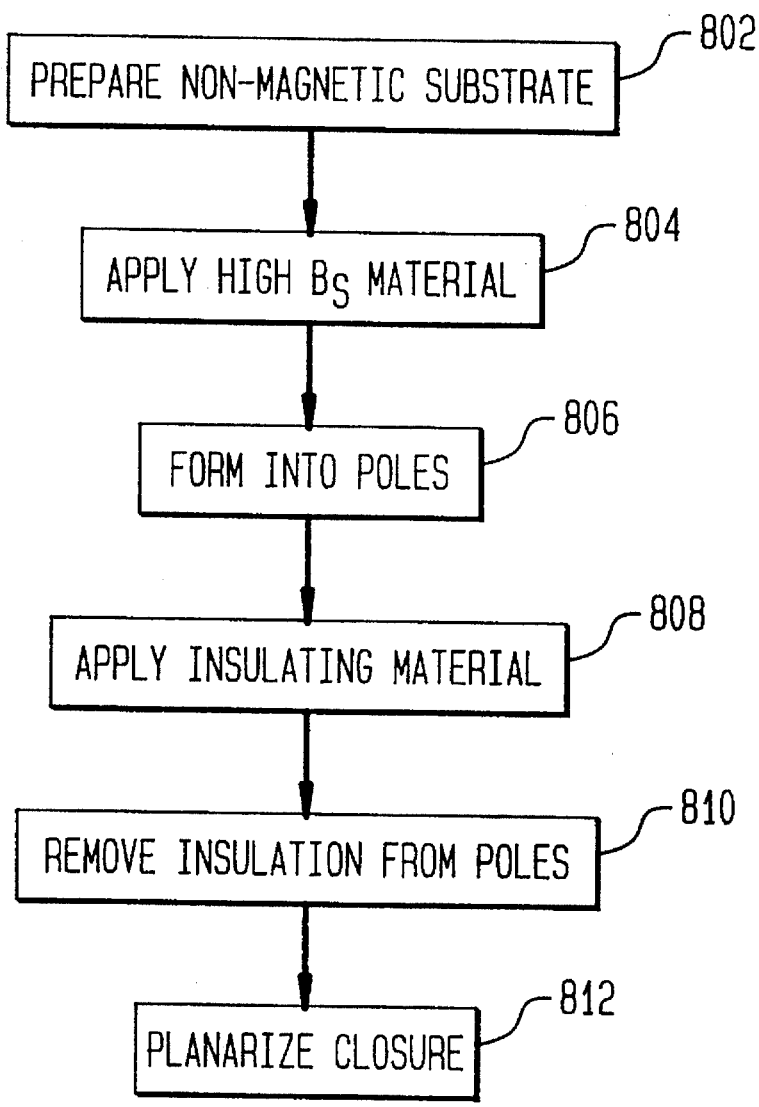

MAGNETIC TAPE HEAD WITH A HIGH SATURATION FLUX DENSITY MAGNETIC POLE INTERPOSED BETWEEN A NONMAGNETIC CLOSURE SECTION AND A MAGNETIC FERRITE SUBSTRATE

RELATED APPLICATIONS

The following related application of common assignee contains some common disclosure and is concurrently filed with the present application: METHOD OF MANUFACTURING A MULTIPLE TRACK THIN FILM RECORDING HEAD Ser. No. 08/263,828.

BACKGROUND OF THE INVENTION

1. Field of the Invention

This invention relates generally to the field of magnetic recording, and more particularly, to a high efficiency multiple track longitudinal thin film tape head and a method for making the magnetic tape head.

2. Related Art

In the course of developing various systems for the storage of data, data processing systems have traditionally utilized magnetic tape as a data storage medium. In common tape drive systems the magnetic tape cartridge in which the magnetic media is enclosed is inserted into a tape transport system. The magnetic tape is then wound and rewound between a supply reel contained within the tape cartridge and a take-up reel in the tape transport system. The tape is transported along a tape path which brings the tape into contact with, or adjacent to, a magnetic tape head located along the tape path. Magnetic tape heads used in present-day tape drive systems are multi-track tape heads having separate read and write elements associated with each data track on the magnetic tape. This enables multiple track magnetic tape heads to read and write several streams of data (one per track) simultaneously. The magnetic tape is typically guided past the read/write head by air bearings which provide an interface of forced air with the magnetic tape to lower friction forces between the tape and bearing surface.

An example of a magnetic tape drive system which stores 18 tracks of data on a standard half-inch magnetic tape housed in the 3480-type cartridge is the StorageTek 4480 tape drive system, available from Storage Technology Corporation, Louisville, Colo., U.S.A. An example of a magnetic tape drive system which stores 36 tracks of data on the same half-inch magnetic tape is the StorageTek 4490 tape drive system, also manufactured by Storage Technology Corporation.

A typical tape head assembly for a magnetic tape drive comprises an approximately horseshoe-shaped core made from a magnetic material such as nickel zinc ferrite. A coil of wire wound around the core, referred to as the write coil, is used to induce a magnetic field within the core. The open end of the horseshoe forms what is referred to as a gap. Often times, the tape head manufacturing process leaves a second opening at the opposite end of the horseshoe. In such a configuration the first opening is referred to as the front gap since it is proximate to the magnetic tape media. The second opening which is further from the magnetic tape media is then referred to as the back gap.

For write operations, a time-varying electric current, referred to as a write current, is sent through the write coil. This write current produces a time-varying magnetic field in the core. If the core was a complete circle (for example, a toroid) the magnetic flux lines would travel in a circle along the core. However, the core does not completely close upon itself due to the front and back gaps. Rather, the magnetic flux lines bridge the front gap forming what is referred to as a gap field.

The magnetic tape is passed over the front gap at a predetermined distance such that the magnetic surface of the tape passes through the fringes of the gap field. As the write current changes, the gap field changes in intensity and direction. These temporal variations in the gap field result in a spatial pattern of magnetization on the magnetic tape. Thus, electronic data signals can be converted to magnetic signals and the data stored magnetically on the magnetic tape.

Recently, there has been a great demand for increasing the data throughput of magnetic tape transport systems used in conjunction with high-speed digital computers. In order to utilize the high-speed capabilities of these computers, it is necessary to increase the amount of data stored on a magnetic tape and to increase the speed at which the data is written to or retrieved from the magnetic tape media.

To increase the data storage capacity of the tape drive systems, the areal density of the magnetic tape media which stores the data must be increased. Areal density is defined as the number of units of data stored in a unit area of the tape. Areal density is determined by two components: the linear density and the track density. To increase the areal density of a magnetic tape media, one must increase either or both, the linear density and track density of the magnetic tape.

Track density is defined as the number of data tracks per unit width of magnetic tape. Two characteristics associated with track density are track width, defined as the actual width of an individual data track; and track pitch, defined as the distance from the center of one data track to the center of a neighboring data track. As magnetic tape head size decreases, the track pitch and track width of the magnetic tapes is decreased, thereby increasing track density.

An example of the increasing track density can be seen by comparing the StorageTek 18-track 4480 tape drive system with the StorageTek 4490 36-track tape drive system. As discussed above, both systems support the half-inch magnetic tape contained in the 3480-type cartridge. The magnetic tape used in the 4480 18-track tape drive system has a track pitch of approximately 630 µm and a track width of approximately 540 µm. The magnetic tape used in the 4490 36-track tape drive system has a track pitch of approximately 315 µm and a track width of approximately 285 µm. Thus, the track width of the 36-track system is approximately half the track width of the 18-track system. Also, the distance between data tracks in the 36-track system is approximately a third of the distance between the data tracks in the 18-track system.

Linear density is defined as the number of units of data stored per unit length of a magnetic tape data track. Present-day tape drive systems use chromium dioxide ($CrO_2$) magnetic tapes. The maximum linear density of a magnetic tape is primarily a function of the composition of the magnetic tape media. To increase the linear density, magnetic recording devices are beginning to use high-coercivity tapes such as metal particle and metal evaporated tapes. High-coercivity magnetic tapes have enhanced high-frequency-response characteristics, enabling them to store data at linear densities which are substantially greater than the standard $CrO_2$ magnetic tapes.

The coercivity of some metal particle tapes is substantially greater than the more common thick/thin $CrO_2$ tapes.

Thus, the gap field required to write to metal particle tapes is correspondingly greater than that to write to $CrO_2$ tapes. This larger gap field is typically greater than that which can be generated using conventional ferrite heads. With conventional ferrite heads, the gap field strength is substantially proportional to the write current, but only up to a threshold level where the magnetic material on either side of the front gap (the pole tip) saturates. After this saturation point is reached, increasing the write current results in little or no increase in the gap field strength. This phenomenon is known as "pole-tip saturation." For example, a NiZn ferrite magnetic head begins to saturate when writing to tape media having coercivity of approximately 600 Oersteds. The MnZn ferrite magnetic head begins to saturate when writing to tape media having a coercivity of approximately 1,000 Oersteds.

One approach to writing to high coercivity multiple magnetic tapes without experiencing pole tip saturation is described in commonly owned U.S. utility patent application entitled, "Multi-Track Longitudinal, Metal-In-Gap Head," Ser. No. 08/094,322, herein incorporated by reference in its entirety. This type of magnetic tape head is capable of achieving the necessary write current to write to high coercivity tapes. However, as track density increases, the glassed closure portion of the Metal-in-Gap (MIG) magnetic tape head becomes fragile and fractures as the size of embedded ferrite poles decreases. Thus, the multiple track MIG magnetic tape head is only extendable to a maximum of approximately 300 tracks per inch (TPI).

Another drawback of the MIG magnetic tape head design is that an unintentional magnetic gap referred to as a "pseudo-gap," forms between the high saturation flux density material and the ferrite due to the different materials of each. As a result, the magnetic flux lines bridge this unintentional gap as well as this front gap, thereby deteriorating the recording performance of the magnetic tape head.

Another drawback of the MIG magnetic tape head design is that the track definition which can be achieved is limited by the tolerances associated with the ferrite sawing techniques which are used to form the substrate and closure sections.

Another magnetic head design directed to writing to high coercivity magnetic tapes is the full thin film head (TFH). Magnetic heads having thin film pole pieces were developed to increase the saturation moment of the pole pieces and to increase the operating efficiency of the transducers. However, there are a number of drawbacks to conventional thin film heads.

One drawback of the TFH design is that the winding patterns, which are deposited on the substrate surface, have to be planarized prior to depositing the top pole piece. This increases the fabrication costs and decreases the yield of multiple track thin film magnetic heads.

Another drawback to conventional TFHs is the resultant thick coil planarization stack requires a sloped region in the top pole in order to form the direct gap. This sloped region of the top pole is prone to saturation, thereby limiting the write current which may be achieved.

Another drawback of the thin film magnetic head is the inability to withstand the abrasion on the magnetic recording medium, especially in the contact recording situation. High density recording requires the minimization of spacing between the surface of the tape media and the functional recording gap between the pole pieces. With the soft magnetic material, thin film poles are susceptible to wear by the media. This results in the pole piece wearing down in a direction away from the tape media, thereby increasing the size of the recording gap. This prevents conventional thin film magnetic heads from maintaining the necessary flux density at the location of the tape to write to high coercivity magnetic tape media.

Another drawback of the of the thin film head design is that the yield on multi-track arrays is low due to the multitude of processing steps which are required. Typically, more than fifteen photolithographic steps are performed in manufacturing conventional TFHs. When manufacturing a multiple-track magnetic head, wherein a flaw in a single track results in the complete magnetic head being unusable, this number of lithographic steps results in the fabrication process having a low yield.

One thin film head which has experienced some of the above problems is described in U.S. Pat. No. 5,142,768 to Aboaf et al. (Aboaf). In Aboaf, a method for manufacturing magnetic tape heads is described which includes the deposition of a thin film of soft magnetic material onto the substrate. This requires the substrate to be planarized which decreases the yield as described above. In addition, the magnetic head design described in Aboaf experiences the wash out problems described above. To overcome this problem, a conductor is deposited on the ferrite and the write element is operated in the opposite direction.

Thus, what is needed is a longitudinal multiple track magnetic tape head capable of writing data to high coercivity magnetic tapes at increasingly higher track densities. The write element must achieve the necessary gap field strength without experiencing pole tip saturation. In addition, the write element must require few fabrication steps to achieve an acceptable yield of multiple track magnetic tape heads.

SUMMARY OF THE INVENTION

The present invention is a high-efficiency write element for use with a multi-element, multi-track longitudinal magnetic tape head. The present invention provides the desired gap field strength to write to high coercivity magnetic media and can be expandable to higher track densities without experiencing pole tip saturation. The write element of the present invention possesses the positive features of both, the metal-in-gap (MIG) and thin-film head (TFH) designs, while eliminating their respective limitations and drawbacks.

The write element of the present invention comprises a magnetic ferrite substrate having a configured surface, a conductive thin-film coil disposed on the substrate, and a non-magnetic closure section having a planer surface parallel and adjacent to the configured surface of the ferrite substrate to engage the configured surface and enclose the conductive coil. The substrate and closure sections serve as pole pieces to define a front and back gap therebetween and have a high saturation flux density pole piece interposed between the substrate and closure sections. The surface area of the pole piece is substantially equivalent to the cross sectional area of the back gap region.

The write element of the present invention includes a recessed channel formed on the surface of the substrate in which the conductive thin film coil is disposed. This places the coil windings below the surface of the substrate, enabling it to maintain a planar surface. The write element may also include a trench formed in the substrate below the recessed channel which is parallel with the front gap region. This trench is filled with a nonmetallic, nonmagnetic composition such as glass to form an insulator to control the path of the magnetic flux.

An alternative embodiment may include the application of a high saturation flux density composition on the substrate in a region adjoining the front gap. This enables the write element to operate in a bi-directional mode.

A magnetic recording head according to the present invention may also include a row of transducing elements, separate read and write elements, according to the preferred embodiment, with the read elements produced from strips of magnetoresistive (MR) material interleaved with alternating write transducers.

In a method of making the magnetic head of the present invention, the steps include obtaining a block of clean, flat, polished ferrite substrate such as NiZn or MnZn ferrite. A slot or trench is cut into the ferrite material with an abrasive saw or laser scribe. If bi-directional operation is desired, 1–2 micrometers of high saturation flux density material such as NiFe is sputtered over the entire substrate surface. The trench is then back-filled with melted glass. The flat, polished surface of the ferrite is reformed by grinding and lapping. A recess is then formed in the ferrite and glass by photolithography and ion milling. An insulating gap spacer is then deposited onto the substrate surface. A conductive thin film coil is then deposited on the ferrite surface in the recesses by photolithography and either plating, sputtering, or evaporating techniques.

For the closure section, a clean, flat, polished non-magnetic substrate such as CaTi or non-magnetic ferrite material is obtained. A high-saturation flux density magnetic material is then deposited on the closure surface by sputtering or plating to form a continuous magnetic pole tip. The magnetic pole tip is then formed into separate poles by photolithography and ion milling. The surface of the closure section is then coated with an equal thickness of insulating material such as $Al_2O_3$. The insulating material is then removed from the top of the poles by photolithography and etching. If necessary, the closure section may be planarized by fine lapping.

After the substrate and closure sections are completed, the closure section is attached to the substrate with an epoxy. Each magnetic pole piece has a top section which aligned with the front gap and a bottom section which is aligned with the back gap. The head surface is then contoured.

One advantage of the present invention over the metal-in-gap (MIG) design is the elimination of the-glassed closure since there is no need for isolation as in the MIG magnetic tape head. This enables the overall magnetic tape head size to be decreased without experiencing the associated drop in yield of MIG magnetic tape heads during the manufacturing process due to the increased fragility of the glass. The elimination of the glassed feature of the closure reduces the fabrication steps which have to be performed and increases the yield as the fabrication process.

Another advantage of the present invention is that the thin-film windings do not need to be planarized. This is because the planar pole piece is placed on the closure section rather than directly on the substrate. Thus, the planarization step which is typically performed in the fabrication of thin film magnetic heads is eliminated in the magnetic head of the present invention.

Another advantage of the present invention is that the top pole piece is essentially planar. It does not experience the saturation problems associated with the sloped pole piece utilized in the thin-film magnetic heads.

Another advantage of the present invention is that the pole piece is in close proximity to the ceramic closure section. This minimizes the amount of wear experienced by the pole piece. This, in turn, reduces the washout problem experienced by the metal pole in the thin-film magnetic heads.

Another advantage of the present invention is the ability to be extendable to higher-track densities which cannot be achieved with the metal in gap approach described above due to the fragility of the glassed closure section and the tolerances associated with the fabrication techniques utilized to make the MIG head.

Another advantage of the present invention is that the write elements can be interleavable with magnetoresistive (MR) read elements.

Another advantage of the present invention is that the overall cost to fabric are less that in the conventional magnetic head designs due to the fewer processes which are required.

Another advantage of the present invention is that the yield of the fabrication process is greater that of thin film magnetic heads because a total of four lithographic steps are used in the fabrication process rather than 14 used in the thin film magnetic head fabrication process.

Further features and advantages of the present invention, as well as the structure and operation of various embodiment of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein:

FIG. 8 is a flow diagram form of the operational steps taken in the manufacturing process to produce the non-magnetic closure section of the magnetic head of the present invention.

DETAILED DESCRIPTION OF THE PREFERRED EMBODIMENTS

The present invention is a multiple track, longitudinal, magnetic tape head capable of providing a gap field strength sufficient to write data to high-coercivity magnetic tapes at increased track densities. The method of manufacturing the magnetic tape head of the present invention has fewer potentially damaging steps, thereby increasing the yield.

Figure 1:
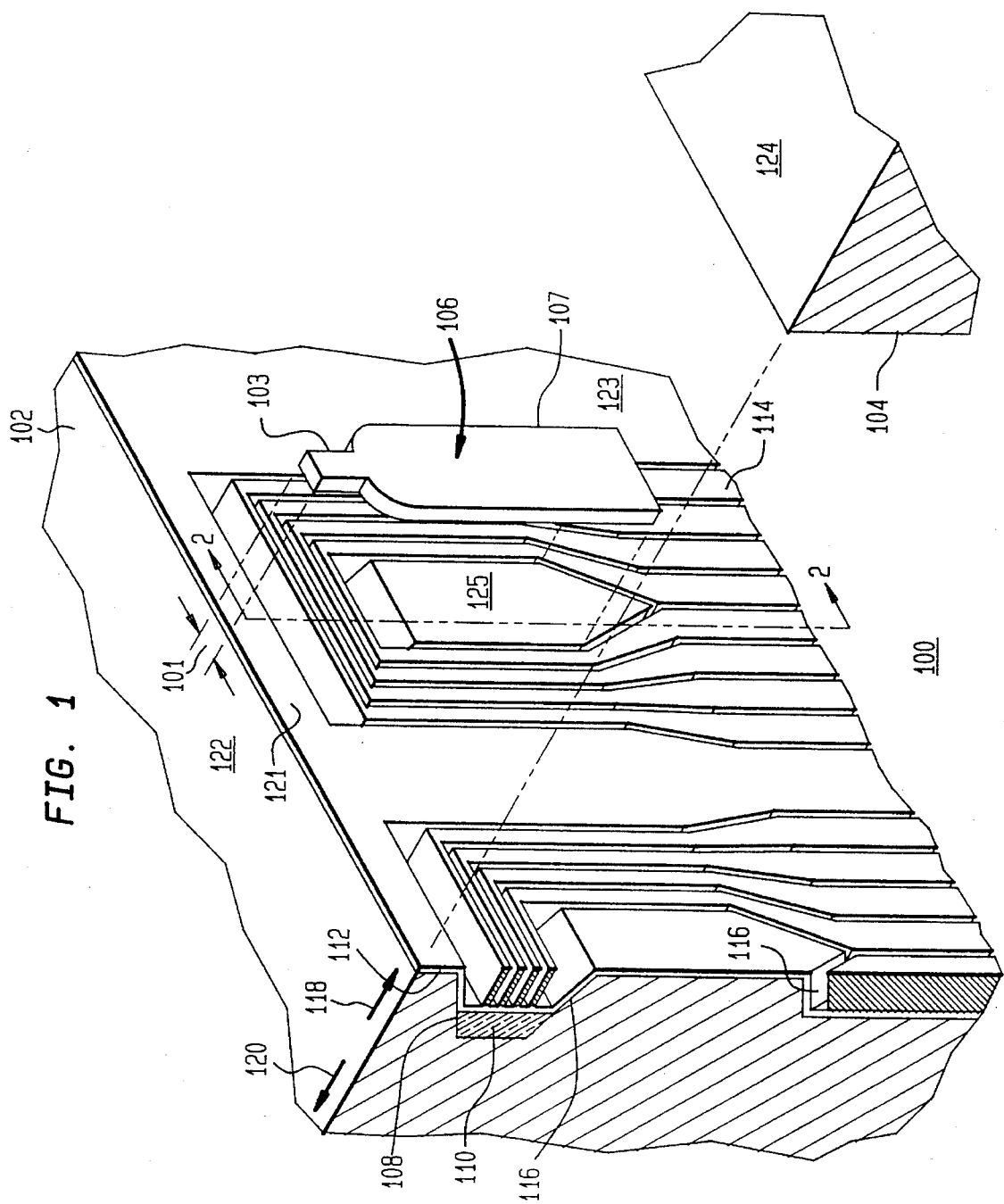
FIG. 1 is an isometric view of the longitudinal magnetic tape head of the present invention, wherein the closure section is separated from the substrate illustrating the position of the magnetic pole piece.
Figure 2:
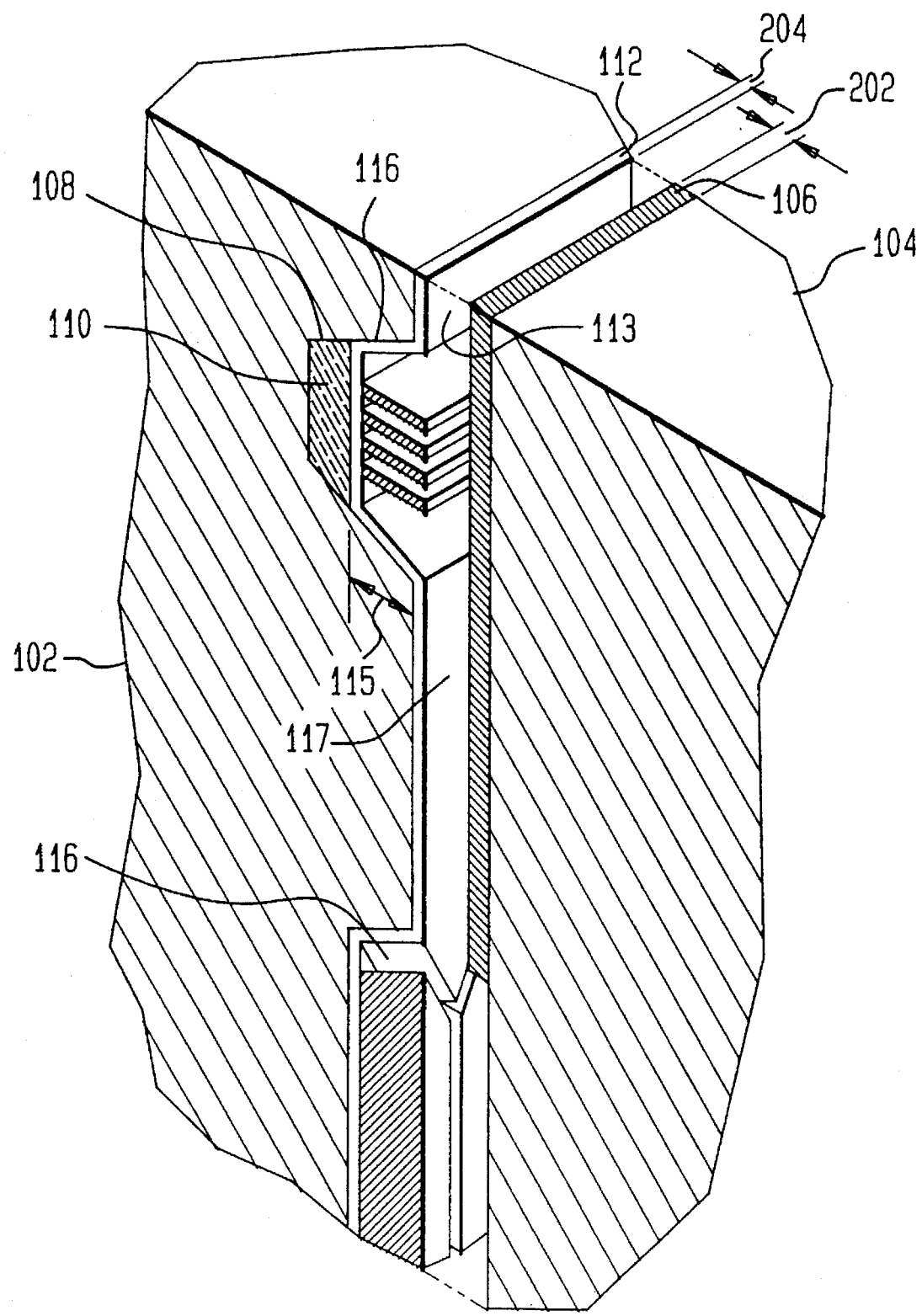
FIG. 2 is a cross-sectional view of the write element of the present invention taken along section 2—2 of FIG. 1.
Figure 3:
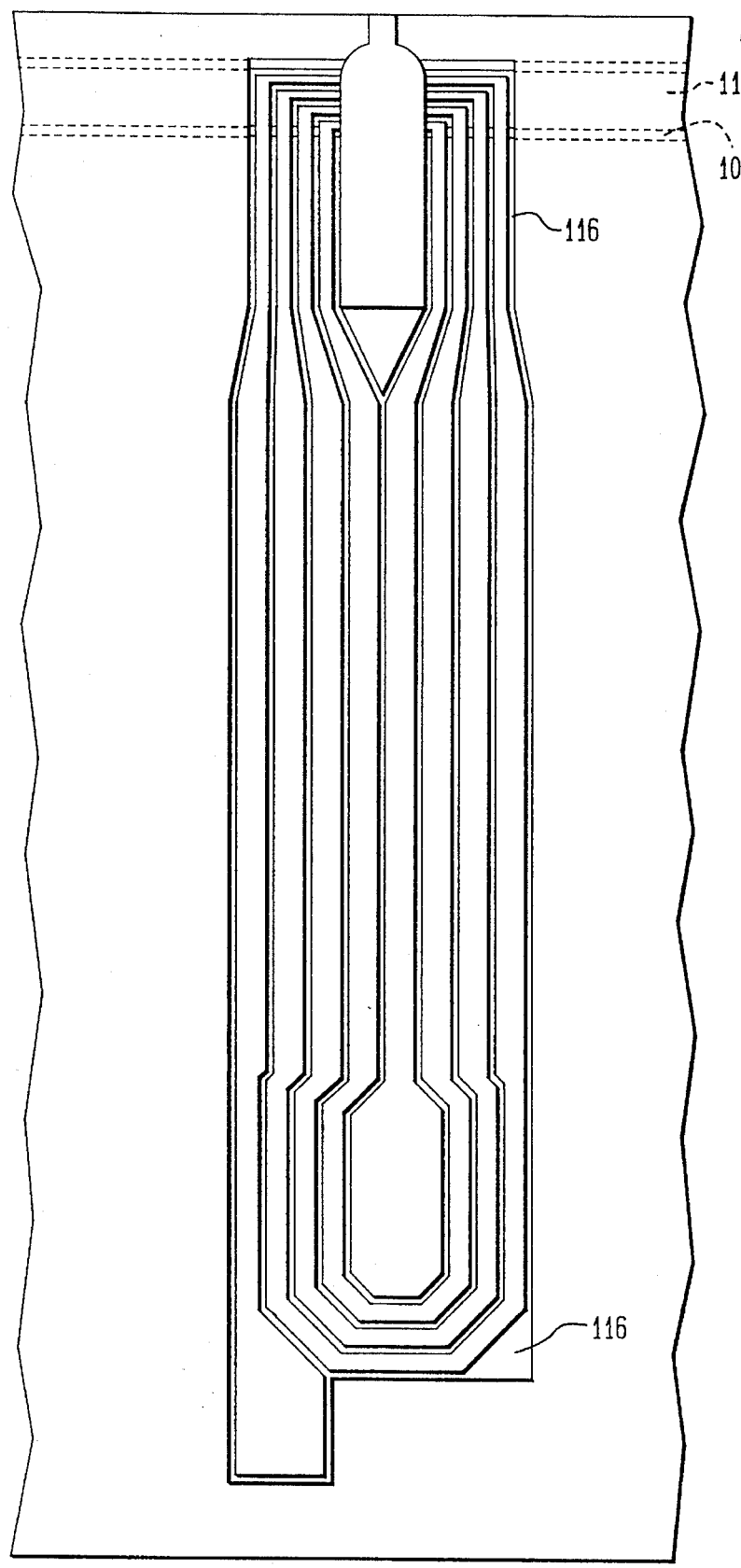
FIG. 3 is a front view of the ferrite substrate illustrating the position of the magnetic pole piece relative to the front gap and back gap.

FIG. 1 is a perspective diagram illustrating the write element of the present invention with the closure section 104 pulled back from the substrate 102 to expose the area in which coil windings 114 and magnetic pole piece 106 are placed. FIG. 2 is a cross-sectional view of the write element 100 taken along section lines 2—2 of FIG. 1. FIG. 3 illustrates a front view of ferrite substrate 102 with the closure section 104 removed to show the position of magnetic pole piece 106 on substrate 102.

Referring to FIGS. 1–3, the write element of the present invention is now described. Write element 100 comprises a substrate 102 and a closure section 104 driven by a thin film conductive coil 114. The fringing magnetic field from the front gap 113, formed from the substrate 102 and closure section 104, is used to write to a magnetic tape passing over surface 122 of ferrite substrate 102 and surface 124 of closure section 104. A trench 108 is formed in the surface of ferrite substrate 102. Trench 108 extends along the length of ferrite substrate 102 and contains a non-magnetic insulator 110 such as glass. Substrate 102 is configured with a recessed channel 116 in which thin film conductive coil 114 is deposited. Interposed between ferrite substrate 102 and closure section 104 is a magnetic pole piece 106. The structure and assembly of the write element 100 of the invention will be described in detail below with reference to the method of manufacturing the magnetic tape head of the present invention.

Figure 5:
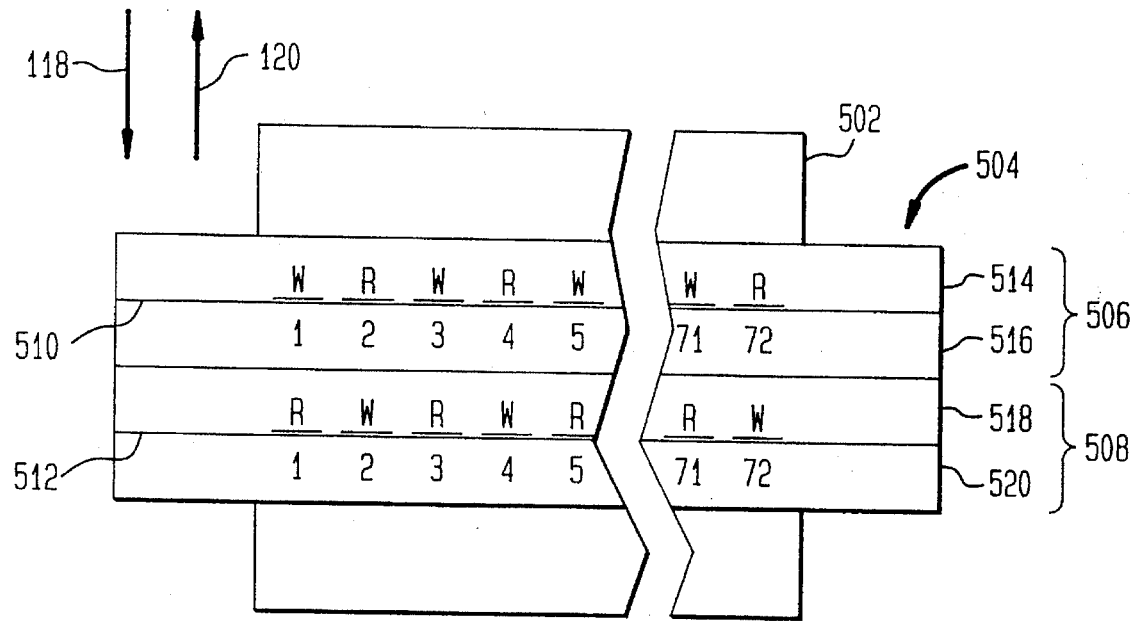
FIG. 5 is a top view of a longitudinal magnetic tape head wherein the write element of the present invention is implemented.

FIG. 5 illustrates a top view of a typical longitudinal magnetic tape head, wherein the write element of the present invention is implemented. The track density of this longitudinal tape head is 72 tracks on a standard half-inch tape. The write element of the present invention is suitable for use in a longitudinal magnetic tape head having such track density. However, it should be known that the write element of the present invention may be implemented in a longitudinal magnetic tape head of any track density, such as 18, 36, 144, or greater track densities. It should also be noted that the magnetic tape head to be used in the practice of the present invention can take on the form of any number of well known arrangements. For example, FIG. 5 illustrates an interleaved tape head 504 wherein the read and write elements, marked R and W respectively, are configured in an alternating, odd/even format. However, as will be apparent to one skilled in the relevant art, the write element of the present invention may be implemented in non-interleaved longitudinal tape heads as well. For example, the write element of the present invention may be implemented as in the StorageTek 4480 tape drive, which has an 18 track non-interleaved magnetic tape head.

Referring to FIG. 5, magnetic tape media 502 generally moves in both a forward and reverse direction as indicated by arrows 118 and 120, as described above. The magnetic tape media 502 operates in a transducing relationship with magnetic head 504 in the standard manner known in the art. Magnetic head 504 includes two modules 506,508 of generally identical construction. These two modules are mounted together to form a single physical unit 504 such that the transducing or front gaps 113 are accurately aligned with respect to the direction of the magnetic tape media 502 movement.

In magnetic head 504, each module 506,508 includes a gap line 510 and 512, respectively. The individual gaps of each module 506,508 are accurately located along gap lines 510 and 512. The magnetic tape head 504 includes alternating read/write gaps along the length of each of the gap lines 510 and 512 for each of the modules 506,508. There are 36 read transducers and 36 write transducers in each of the modules 506,508. Magnetic tape 502, therefore, has 72 tracks across its one-half inch width. The read gaps of one module are aligned and cooperate with the write gaps of the other module. Thus, the gaps identified as "1" through "72" of module 506 are aligned and cooperate with the gaps identified as "1" through "72" of module 508. Each of the modules 506,508 include a magnetic ferrite substrate 102 and a magnetic ferrite closure section 104 as described above.

Figure 6:
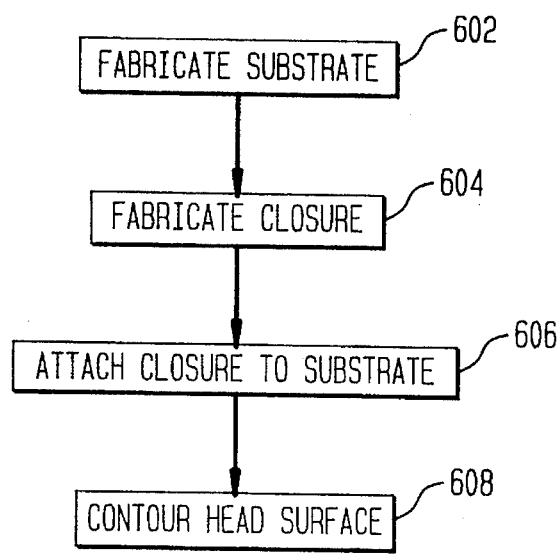
FIG. 6 is a flowchart of the basic operational steps performed in manufacturing the magnetic tape head of the present invention.
Figure 7:
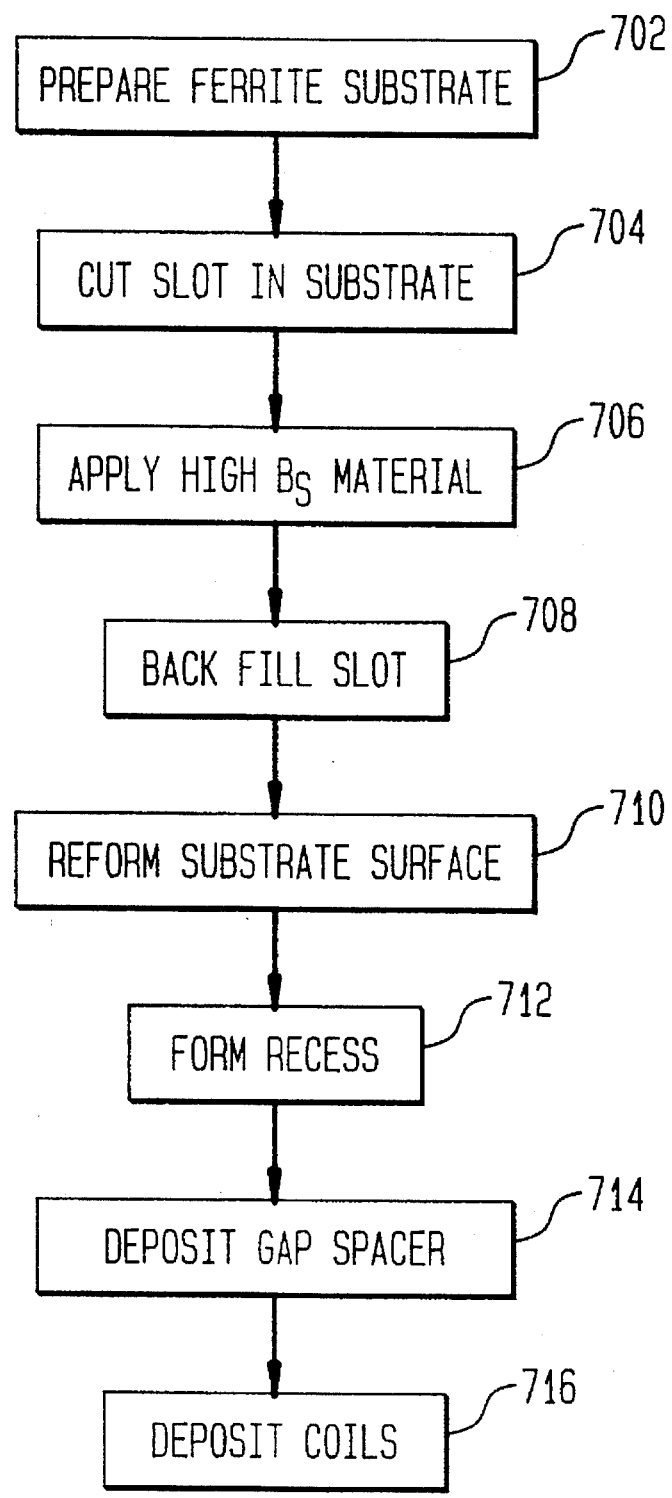
FIG. 7 is a flow diagram form of the operational steps taken in the manufacturing process to produce the ferrite substrate of the magnetic head of the present invention.

Referring to FIGS. 6—8, the method of manufacturing the multiple track, thin film recording head of the present invention is now described. Referring to FIG. 6, ferrite substrate 102 is fabricated in step 602. This fabrication process for creating ferrite substrate 102 is described in detail below with reference to FIG. 7. The closure section 104 of the write element 100 of the present invention is fabricated in step 604. The fabrication process for creating closure section 104 is described in detail below with reference to FIG. 8. As one skilled in the relevant art would find apparent, steps 602 and 604 can be performed in any sequence or in parallel. Once substrate 102 and closure section 104 are fabricated, they are then attached to each other in a mating relationship to implement one track of the multiple track recording head 504 of the present invention. Once ferrite substrate 102 and closure section 104 are bonded together, the resulting head surface is then contoured in step 608. Fabrication process steps 606 and 608 are discussed in further detail below.

Referring to FIG. 7, the method of manufacturing the ferrite substrate 102 of the present invention is described. First, in step 702, a block of magnetic ferrite material is prepared. This includes cleaning, lapping, and polishing the block of magnetic ferrite material, resulting in ferrite substrate 102. As discussed above, in the preferred embodiment of the present invention, ferrite substrate 102 is comprised of MnZn ferrite. However, as one skilled in the relevant art would find apparent, the preparation of substrate 102 in step 702 of the present invention may be performed on any type of magnetic material capable of operating in the magnetic tape head of the present invention. For example, the block of magnetic ferrite material may be comprised of NiZn ferrite.

After ferrite substrate 102 is prepared in step 702, a slot is cut in a surface 123 of the ferrite substrate to form trench 108. The surface 123 in which trench 108 is formed is the surface of ferrite substrate 102 which will be mated with closure section 104 in step 606, as introduced above. In the preferred embodiment of the present invention, trench 108 is cut with an abrasive saw along a line which is substantially parallel with tape head surface 122. As one skilled in the relevant art would find apparent, other methods for forming such a trench may be used. For example, a laser scribe may be utilized in step 704 to form trench 108. Trench 108 increases the efficiency of the write element 100 of the present invention significantly by preventing the flux from taking a detour across magnetic pole piece 106 to the substrate surface 121 adjacent to front gap 113 or to the windings of conductive thin film coil 114. The flux has to travel from substrate surface 121 at front gap 113 through ferrite substrate 102 at a point further from front gap 113 and then through back gap portion 125 of ferrite substrate surface 123 through back gap region 117, up through pole piece 106, and back to front gap 113. By forcing the flux to travel through substrate 102 at a distance which is further from front gap 113 than in conventional magnetic tape heads, a more efficient magnetic flux is achieved at front gap 113.

Figure 4:
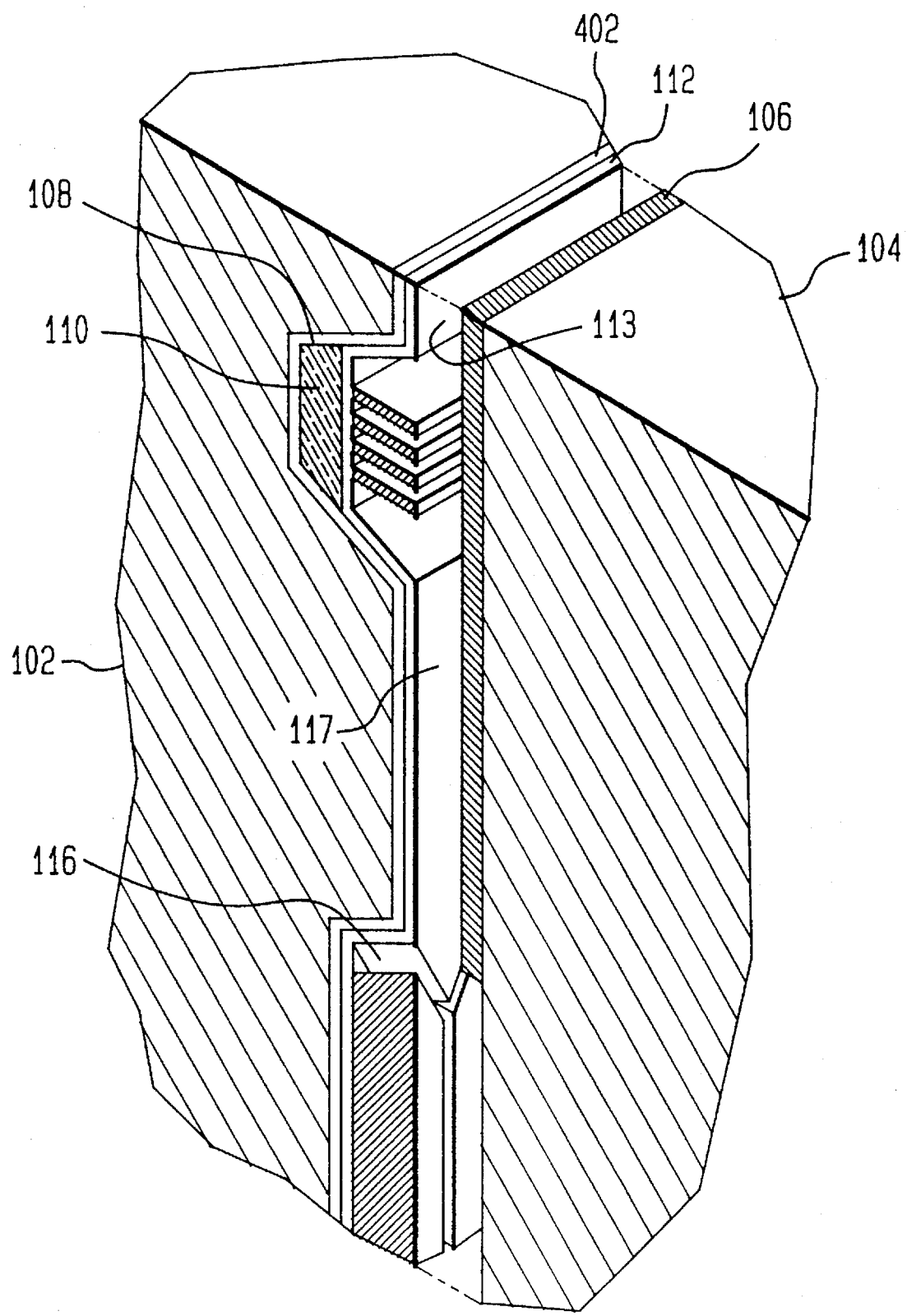
FIG. 4 is a cross-sectional view of an alternative embodiment of the present invention, wherein a high-saturation magnetic flux density material is deposited on the ferrite substrate.

In step 706, a high saturation flux density material is deposited over the surface of the ferrite substrate 102 which is configured with trench 108 to form a conductive thin film layer 402. This is an alternative embodiment of the present invention, which is illustrated in FIG. 4. Referring to FIG. 4, a high saturation flux density material 402 is interspersed between gap layer 112 and ferrite substrate 102, wherein the high saturation flux density material 402 enables the write element 100 of the present invention to achieve bi-directional operation. That is, thin film conductive layer 402 enables the write element 100 of the present invention to operate in ferrite trailing tape path direction 118 as well as pole tip trailing path direction 120. The preferred method for depositing high saturation flux density material 402 in step 702 is sputtering, which is well known in the art. However, other deposition techniques now or later developed may be used. In the preferred embodiment of the present invention, approximately 1–2μM of high saturation flux density material 402 is deposited on ferrite substrate 102. In the preferred embodiment of the present invention, any high saturation flux density material may be deposited on ferrite substrate 102 which can achieve the desired flux density necessary to write to high coercivity tapes. For example, high saturation flux density material 402 may be NiFe, AlFeSil, CoZr, FeN, et cetera.

After trench 108 is formed in the surface of substrate 102, trench 108 is back-filled with an insulating material 110. In the preferred embodiment, step 708 is performed by filling trench 108 with melted glass. However, any known method for filling trench 108 that corresponds with the selected insulator material may be utilized in step 708. The insulator 110 completely fills trench 108 and, when melting glass, typically beads over the configured surface 123 of ferrite substrate 102.

In step 710, the configured surface 123 of ferrite substrate 102 is reformed by grinding and lapping techniques which are well known in the art. This planarization of the ferrite substrate surface removes all extraneous insulation material 110 which may protrude above surface 123. This results in the ferrite substrate 102 having a flat, polished surface with a layer of glass extending the length of the substrate.

In step 712, a plurality of recesses 116 are formed in the configured surface 123 of substrate 102. Recess 116 is etched into ferrite substrate 102 to a depth 115 sufficient to allow conductive windings 114 to be deposited therein in a subsequent step (discussed below). The depth 115 of recessed channel 116 is determined by the chosen winding geometry which is required to achieve a desired flux density for a given write current. Recessed channel 116 is of a geometry to include conductors 114 as well as a layer of insulation 112 (discussed below) in which the thin film conductor coils 114 are routed such that coil windings 114 are flush with or below the surface 123. Thus, there is no need to planarize the ferrite substrate surface 123 after deposition of coils 114 in step 716. This eliminates the grinding and lapping fabrication steps performed in manufacturing conventional thin film magnetic heads which reduces the yield of the fabrication process. This is particularly true for multiple track magnetic heads fabricated to read/write data at high track densities. Thus, step 716 is the last fabrication process step required to fabricate ferrite substrate 102.

As shown in FIGS. 1–3, recessed channel 116 forms a closed path in the surface of ferrite substrate 102. The closed path encircles a portion of ferrite substrate 102, the surface of which forms a back gap portion 125 of ferrite substrate surface 123. Recess 116 is formed not only in the surface of ferrite substrate 102, but also in insulator 110 which fills trench 108. In other words, there is a portion of recess 116 which is formed in the insulator rather than ferrite. Recess 116 may be formed in ferrite substrate 102 and insulator 110 using any known technique now or later developed, such as photolithography and ion etching. However, it is preferred that a photolithographic process be used rather than more intrusive techniques such as sawing. As track densities increase and ferrite substrate 102 decreases in size, non-photolithographic techniques cause fractures and other imperfections in the ferrite material. Photolithographic techniques apply less stress to the substrate, thereby increasing the yield of the fabrication process, especially for multiple track tape heads. In addition, the photolithographic processes are much more accurate than non-photolithographic techniques. Conventional techniques of limited accuracy can produce tape heads which are, in turn, of limited track densities. These problems are eliminated using the more accurate photolithographic process of the present invention, thereby enabling the fabrication process of the present invention to achieve greater track densities than conventional tape heads.

After recessed channel 116 is formed in ferrite substrate 102, a layer of insulation 112 is deposited on the surface 123 of ferrite substrate 102 in step 714. Insulator 112 is deposited on the whole surface 123 of ferrite substrate 102, including recesses 116. This insulating layer deposition process is well known in the art and produces insulation layer 112 that separates ferrite substrate 102 and pole piece 106 by a desired gap length 204 and is referred to as gap spacer 112. In the preferred embodiment of the present invention, any type of the gap producing insulator material 112 may be deposited on ferrite substrate 102. In the embodiment shown in FIGS. 1–4, insulator material 112 is alumina, which is a well-known nonmagnetic aluminum alloy. However, as one skilled in the relevant art would find apparent, other compositions may be deposited on substrate surface 123 in steps 714. For example, insulator material 112 may be comprised of $SiO_2$, or $Al_2O_3$, or $Si_3N_4$. In addition to determining the desired gap length 204, gap spacer 112 also serves as an insulator between coils 114 and ferrite substrate 102.

After gap spacer 112 is deposited on substrate surface 123, conductive thin film coil 114 is deposited on ferrite substrate 102 in recess 116 on top of gap spacer 112. In the preferred embodiment of the present invention, coil windings 114 are deposited on ferrite substrate 102 using photolithography techniques in combination with either plating, evaporating, or sputtering of the metal. As one skilled in the relevant art would find apparent, other techniques now or later developed may be utilized to deposit coil windings 114 on substrate 102. Thin film coil windings 114 may be any conductive metals such as gold, copper, or a combination of both.

As shown in FIG. 1, the portion of recessed channel 116 which is interposed with trench 108 is substantially parallel to the adjacent surface 122 of ferrite substrate 102. The portion of ferrite surface 123 which is between the conductive thin film coils 114 and ferrite substrate surface 122 is referred to as the front gap portion 121 of substrate surface 123.

It should be noted that only two photolithographic processes have been performed in the fabrication of ferrite substrate 102. This substantially increases the yield from the fabrication process over conventional techniques. The first photolithographic process, performed in step 712, is to form recessed channels 116 in ferrite substrate surface 123. The second photolithographic process, which is performed in step 716, is to deposit the inductive thin film coil 114 in recessed channels 116. The combination of steps described above in fabricating ferrite substrate 102 has increased the yield of the fabrication process which has been found to be critical in multiple track thin film magnetic heads. This has been found to be a substantial advantage over the conventional techniques since the materials used in the fabrication process become more fragile and prone to fracture as the substrate decreases in size to achieve higher track densities.

Referring to FIG. 8, the method for manufacturing closure section 104, introduced above in step 604, is now described. Closure section 104 is prepared by obtaining a block of nonmagnetic material such as nonmagnetic ferrite, CaTi, BaTi, or AlTiC, et cetera. The nonmagnetic material is then prepared by cleaning, lapping, and polishing, resulting in closure section 104. In step 804, a high saturation magnetic flux density (high Bs) material is deposited onto the surface of closure section 104. In the preferred embodiment of the present invention, the deposition is performed using sputtering techniques which are well known in the art. However as one skilled in the relevant art would find apparent, other deposition techniques may be used. For example, plating may be used to deposit the high saturation flux density material on closure section 104. High saturation flux density magnetic material may be the same or different than the high saturation flux density material 402 used in the alternative embodiment shown in FIG. 4.

In step 806, this continuous magnetic pole piece is formed into separate pole pieces 106, each associated with a separate write element of magnetic tape head module 504. These separate pole pieces 106 may be formed using any known techniques now or later developed such as photolithography and ion etching.

In the preferred embodiment of the present invention, each pole piece 106 is formed of two sections: a top section 103 and a bottom section 107. Top section 103 has a width 101 which determines the thickness of a data track on magnetic tape 502. When mated with ferrite substrate 102, top section 103 extends from top surface 122 through front gap portion 121. As shown in FIG. 1, bottom section 107 of magnetic pole piece 106 is wider than top section 103, thereby giving bottom section 107 a surface area which substantially covers back gap portion 125 of ferrite substrate surface 123. This enables write element 100 of the present invention to achieve the desired magnetic flux density at front gap 113 since the flux density is dependent upon the cross-sectional area of the region through which it travels. Thus, bottom section 107 is wider than top section 103. In addition, magnetic pole piece 106 has a width 202 which provides a sufficient cross-section for the magnetic flux to travel from the back gap region 117 up through pole piece 106 to front gap region 113.

In step 808, an insulating material is applied to the surface of closure section 104 over magnetic pole pieces 106 to fill the regions formed between neighboring magnetic pole pieces in step 806. These regions are referred to as insulation regions, since they insulate the magnetic field produced in one write element from a neighboring write element. In the preferred embodiment of the present invention, any suitable insulating material may be deposited on closure section 104. For example, insulating material comprised of $Al_2O_3$, $SiO_2$ or $Si_3N_4$ may be deposited to fill the insulation regions between neighboring pole pieces 106.

In step 810, the insulation material is removed from the surface of magnetic pole pieces 106. This may be performed by photolithography and ion etching, lapping, or any other technique which is now known or later developed. Finally, the surface of closure section 104 may be planarized if necessary. This is shown as step 812 in FIG. 8. Since the application of the insulating material in step 808 can be performed in a very accurate manner, there may be no need to planarize the surface of closure section 104 after the insulation is deposited in the insulation regions in step 810.

The configuration of a planar magnetic pole piece 106 on a nonmagnetic closure section 104 achieves a number of benefits which enable the magnetic head of the present invention to write to high coercivity magnetic tapes at track densities which have not been achieved in conventional metal-in-gap and thin film magnetic heads.

Thin film magnetic heads typically have a softer metallic material used as a pole piece which is positioned adjacent to, and at a finite distance from, the harder ceramic material. During the operation of such a thin film head, the softer metallic material wears down over time. Since the magnetic tape media is positioned at a fixed distance from the ceramic surface, the space between the magnetic tape and the pole piece increases as the pole piece wears. The resulting loss of magnetic flux density which operates on the magnetic tape media is referred to as "wash out". The configuration of the present invention reduces this problem by depositing magnetic pole piece 106 directly on the surface of closure section 104. By placing the pole piece 106 in such close proximity to closure section 104, the wash out phenomenon experienced by conventional thin film magnetic heads is substantially reduced.

In the metal-in-gap magnetic head design, a high saturation flux density material is placed adjacent to a ferrite material. This enables the MIG design to also reduce the wash-out problems experienced by thin film magnetic heads. However, placing a metallic pole piece adjacent to a ferrite material results in what is referred to as a "pseudo-gap". Although both materials are magnetic, an intimate magnetic connection is not achieved due to the different materials. As a result, the magnetic flux lines bridge this unintentional gap thereby deteriorating the recording performance. The configuration of the present invention eliminates the pseudo-gap phenomenon experienced by the MIG magnetic head design by placing gap spacer 112 between magnetic pole piece 106 and ferrite substrate 102. Thus, magnetic pole piece 106 is not immediately adjacent to any ferrite material.

As shown in FIGS. 1–3 and discussed above, magnetic pole piece 106 has a planar configuration which is mated with the planar surface of closure section 104. Magnetic pole piece 106 is then mated with the front gap portion 121 and back gap portion 125 of ferrite substrate surface 123. As discussed above and shown in FIG. 1, front gap portion 121 and back gap portion 125 reside in substantially the same plane, and conductive thin film coil 114 lies below this plane in recessed channel 116. Magnetic pole piece 106 is therefore able to be maintained as a planar pole piece. There is no sloped region similar to that in the top pole piece of conventional thin film magnetic heads. As a result, the saturation problems which are experienced by thin film magnetic heads is eliminated by the configuration of the present invention.

Another benefit to the configuration of the present invention is a utilization of a nonmagnetic closure section 104. Since the magnetic pole piece 106 is the only conductor, there is no need to manufacture a thin ferrite closure piece to meet the tolerances necessary to write to high track density magnetic tapes. Thus, the present invention can be extended to higher track densities while maintaining an acceptable yield which cannot be achieved by conventional thin film magnetic heads. In addition, since closure section 104 is nonmagnetic, the fabrication of a multi-slotted, glassed ferrite closure which is used in the MIG design described above is no longer necessary. This enables the present invention to be extended to higher track densities than those achieved by such metal-in-gap designs.

As described above with reference to FIG. 6, after substrate 102 and closure section 104 are fabricated, substrate 102 and closure section 104 are attached to each other. This is shown as step 606 in FIG. 6. In step 606, closure section 104 is juxtaposed in a mating relationship with ferrite substrate 102 to implement one track of the multiple track recording head 100. The top section 103 of magnetic pole piece 106 is aligned with the front gap surface 121 of ferrite substrate surface 123. The bottom section 107 of magnetic pole piece 106 is positioned to be aligned with the back gap portion 125 of ferrite substrate surface 123. The closure section 104 and ferrite substrate 102 are bonded together with an epoxy, thereby forming write element 100.

In step 608, the head surface is contoured by grinding and lapping to provide a substantially convex top surface 122.

While various embodiments of the present invention have been described above, it should be understood that they have been presented by way of example, and not limitation. Thus the breadth and scope of the present invention should not be limited in any of the above-described exemplary embodiments, which should be defined only in accordance with the following claims and their equivalents.

What is claimed is:

1. A write element for a magnetic tape head having a tape head surface, comprising:

a magnetic ferrite substrate having a first surface, wherein a recess is formed on said first surface, said recess having a portion extending substantially parallel to and adjacent with the tape head surface, and wherein a trench is formed in said portion of said recess;

a layer of nonmagnetic composition disposed in said trench to form an insulator;

a conductive thin film coil disposed in said recess;

an insulator layer interposed between said conductive thin film coil and said substrate to insulate said conductive thin film coil from said substrate and to form a magnetic gap layer, wherein a portion of said insulator layer is interposed between said layer of nonmagnetic composition in said trench and said conductive thin film coil;

a nonmagnetic closure section having a planar surface parallel and adjacent to said first surface of said substrate, said closure section engaging said first surface of said substrate and enclosing said conductive coil, wherein said substrate and said closure section serve as pole pieces to define a front gap and back gap therebetween; and a substantially planar high saturation flux density magnetic pole piece interposed between said closure section and said substrate, comprising, a top section interposed between said closure section and said ferrite substrate within said front gap, said top section having a width defining a track width, and a bottom section, integrally formed with said top section, interposed between said closure section and said substrate within said back gap, said bottom section having a surface area substantially equivalent to a cross sectional area of said back gap, wherein said substrate and said closure section are connected to opposite sides of said top section at said front gap and said bottom section at said back gap.

2. The write element of claim 1, wherein said conductive thin film coil comprises at least one turn of electrically conducting material.

3. The write element of claim 1, wherein said layer of nonmagnetic composition is glass.

4. The write element of claim 1, wherein said substrate further comprises:

a high saturation flux density composition layer dispose directly on said first surface of said substrate in a region adjoining said front gap, wherein a portion of said high saturation flux density composition layer is interposed between said trench and said layer of nonmagnetic composition.

5. The write element of claim 1, wherein said recessed has a depth such that said conductive thin film coil does not extend beyond said first surface of said substrate.

6. A write element for a multiple track, longitudinal, magnetic tape head, comprising:

a ferrite substrate having a recess formed on a first surface of said substrate, said recess forming a closed path defining a back gap portion of said first surface and having a first length parallel with a second surface of said substrate parallel with said first surface, said first length and said second surface defining a front gap portion of said first surface;

an electrically conductive material disposed in said recess to form a conductive thin film coil;

a gap spacer interposed on said first surface of said substrate between said conductive thin film coil and said first surface to form a magnetic gap layer, said gap spacer having a thickness defining a back gap region thickness and a front gap region thickness;

a high saturation flux density composition layer disposed directly on said front gap portion of said first surface of said substrate so as to be interposed between said gap spacer and said first surface of said substrate;

a nonmagnetic closure section having a planar surface parallel and adjacent to said first surface of said substrate, said closure section engaging said first surface of said substrate and enclosing said conductive thin film coil; and a high saturation flux density magnetic pole piece interposed between said closure section and said substrate, comprising:

a top section interposed between said closure section and said ferrite substrate within said front gap, said top section having a first width defining a track width, and a bottom section, integrally formed with said top section, interposed between said closure section and said substrate within said back gap, said bottom section having a surface area substantially equivalent to a cross sectional area of said back gap, wherein said substrate is configured with a trench formed in a portion of said recess parallel to and adjacent with said front gap, said trench is filled with a discrete layer of nonmetallic, nonmagnetic material, and wherein said substrate and said closure section are connected to opposite sides of said top section at said front gap and said bottom section at said back gap.

7. The write element of claim 6, wherein said recess has a depth such that said conductive thin film coil does not extend beyond said first surface of said substrate.

8. A multitrack, longitudinal magnetic tape head for writing data to magnetic tapes, comprising:

a magnetic ferrite substrate;

a plurality of recesses formed in a first surface of said substrate, each of said plurality of recesses defining a back gap portion of said first surface, each of said recesses having a first portion substantially parallel with a second surface of said substrate adjacent to said first surface, said first portion of said plurality of recesses and said second surface of said substrate defining a plurality of respective front gap portions of said first surface, wherein at least one of said plurality of recesses has a trench formed in said first portion of said recess, said trench being filled with a layer of nonmagnetic composition to form an insulator;

a gap-producing insulating material interposed on said first surface of said substrate to form a magnetic gap layer;

an electrically conductive material positioned in each of said plurality of recesses on said gap-producing insulating material to form conductive turns, wherein a first portion of said gap-producing insulating material is interposed between said first surface of said substrate and said electrically conductive material and a second portion of said gap-producing insulating material is interposed between said layer of nonmagnetic composition disposed in said trench and said electrically conductive material forming conductive turns;

a nonmagnetic closure section; and a plurality of magnetic pole pieces interposed on a first surface of said nonmagnetic closure section, each of said plurality of magnetic pole pieces comprised of a high saturation magnetic flux density composition and having a top section and a bottom section and separated from a neighboring magnetic pole piece by an insulation region, wherein said first surface of said closure section is bonded to said first surface of said substrate such that said top section of each of said plurality of magnetic pole pieces is aligned with a respective one of said front gap portions of said first surface of said substrate and said bottom section of said magnetic pole piece is aligned with a respective one of said back gap portions of said first surface of said substrate.

9. The magnetic tape head of claim 8, further comprising:

a high saturation magnetic flux density composition layer disposed directly on said first surface of said substrate, wherein a portion of said high saturation flux density composition layer is interposed between said trench and said layer of nonmagnetic composition.

10. The magnetic tape head of claim 8, wherein said layer of nonmagnetic composition in said trench is glass.

11. The magnetic tape head of claim 8, wherein said magnetic ferrite substrate comprises MnZn ferrite substrate.

12. The magnetic tape head of claim 8, wherein said high saturation magnetic flux density composition layer has a thickness of between 1 and 2 micrometers.

* * * * *